July 30, 1957  T. C. KORSMO  2,800,798
CONTROL VALVE WITH THREE-POSITION LINKAGE
Filed Aug. 16, 1956

INVENTOR
Torbjorn C. Korsmo

BY

ATTORNEYS

United States Patent Office 2,800,798
Patented July 30, 1957

2,800,798

CONTROL VALVE WITH THREE-POSITION LINKAGE

Torbjorn C. Korsmo, Madison, Wis., assignor to Madison-Kipp Corporation, Madison, Wis., a corporation of Wisconsin Application August 16, 1956, Serial No. 604,548

2 Claims. (Cl. 74—102)

The present invention provides a hand-grip with controller for three-position devices, particularly three-position plunger valves ported to control flows of two different fluids.

The invention will be described as embodied in a pneumatic cleaning tool for blowing chips out of casting dies, and then spraying the die with liquid lubricant, that being a field for which the device has been used, and in which it has demonstrated marked utility.

The value of the device resides in its simplicity, its rugged construction and the absence of fine adjustments. In working on die casting machines, the operators commonly wear heavy gloves. This makes manipulation of three-position devices of conventional form rather difficult, and has created a need for the device here disclosed. An important feature contributing to success is the use of a control member, such as a balanced valve of the piston type, characterized by free and precise action. Another is the use of an actuating linkage using rather short levers.

The tested embodiment is illustrated in the accompanying drawing, in which all three views are axial sections, differentiated as to position.

Fig. 1 shows the position to which the device moves under spring bias. It is thus the normal position. In a tool such as described, all flow ports are closed by the valve plunger in this position.

Figure 1:
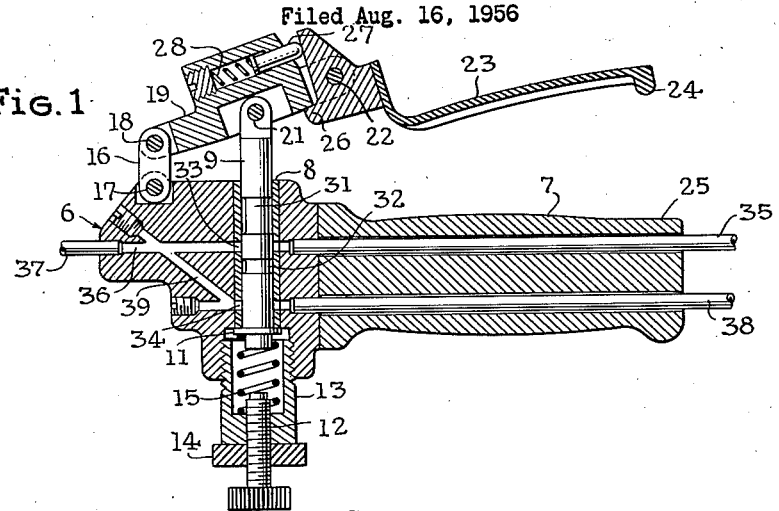

Referring to all three figures of the drawing, 6 represents the valve housing and 7 a hand-grip fixed thereto in any suitable way. Fixed in a bore in housing 6 is a ported valve seat bushing 8 in which the valve plunger 9 is shiftable in the direction of its axis through a limited range. Outward motion, i. e. motion upward with reference to the drawing, is limited by a flange 11. Inward motion is limited by an adjustable stop on the end of a threaded stem 12. The stem 12 is threaded in the cup 13 which is fixed in the valve body 6. A threaded mount for the cup is shown, but any known fixed mounting may be used. Part 14 is a check nut to lock the adjusted position of the stem 12. When the check nut is freed the stem may be turned by a knurled head, shown in the drawing.

A spring 15, whose lower end seats in the cup 13 around the stem 12, reacts upward on the flange 11 so that the valve plunger 9 is biased toward its upper limit of motion. A radius link 16 is hinged by pin 17 to the body 6 and by the pin 18 to a member 19 which will be called the primary lever. The lever 19 is also hinged by the pin 21 to the upper end of the valve plunger 9. The axes of the pins 17, 18 and 21 are parallel.

A fourth parallel hinge axis is afforded by a pin 22 which is mounted in the primary lever 19 near its outer or swinging end. Hinged on the pin 22 is a movable hand-grip 23. A stop lug 26 on the hand-grip, engages a part of primary lever 19 and limits the angular motion of grip 23 in one direction relatively to primary lever 19. A plunger 27, guided in a portion of the primary lever 19 and urged outward by coil compression spring 28, reacts on a portion of the hand-grip 23 to cause the lug 26 normally to engage the primary lever 19.

Thus the hand-grip 23 can swing counterclockwise relatively to the primary lever 19, but its swinging motion in the opposite direction is positively limited by the lug 26.

The hand-grip 23 has, at its outer extremity, a rib or boss 24 positioned to collide with a stop surface 25 on the fixed hand-grip 7. This engagement occurs when the valve plunger 9 has reached the desired intermediate position, so that the effect is to afford arrest of the valve when it arrives at intermediate position. This position is shown in Fig. 2.

Figure 2:
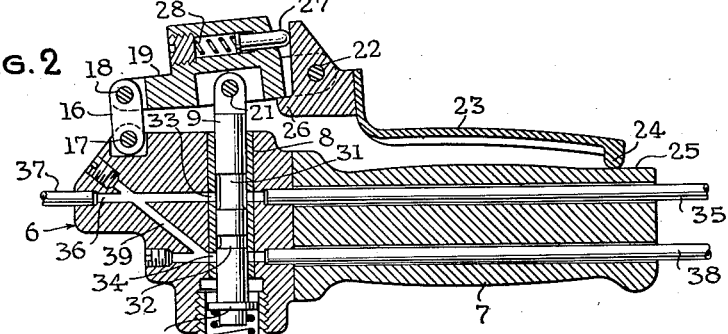
Fig. 2 shows the intermediate position in which only the blast port is open. The parts are impositively arrested in this position, permitting manipulation "by feel."

With the parts positioned as in Fig. 2, the plunger 9 may be forced further inward by squeezing the hand-grip 23 against the fixed hand-grip 7. This moves the parts to the limiting position shown in Fig. 3, in which the plunger 27 has yielded and the inner portion of the hand-grip 23 has moved to, or nearly to, contact with the fixed hand-grip 7.

In the first range of motion above described, only the spring 15 resists motion. In the second range of motion, both spring 15 and spring 28 resist motion. As a consequence, the device affords a normal position, an intermediate position defined by a sudden rise in resistance and a final position at the inner limit of motion of the plunger 9. Because the valve plunger 9 is balanced as to fluid pressure, it offers no resistance and the springs control the "feel."

The valve plunger here illustrated is typical, and affords good characteristics. The plunger 9 has three lands separated by annular grooves 31 and 32. In the normal position of the valve, shown in Fig. 1, the lands obstruct the ports 33 and 34 formed in the bushing 8. The ports 33, when unobstructed, afford communication from the air pressure line 35 operated at say 80 p. s. i. to the nozzle port 36 which leads to the blast nozzle 37. The ports 34, when unobstructed, afford communication from the lubricant line 38 operated at say 10 p. s. i. to the branch port 39 which leads to the blast nozzle 37. The passages shown to the left of the bushing 8 are produced by drilling and plugging, a conventional method.

Figure 3:
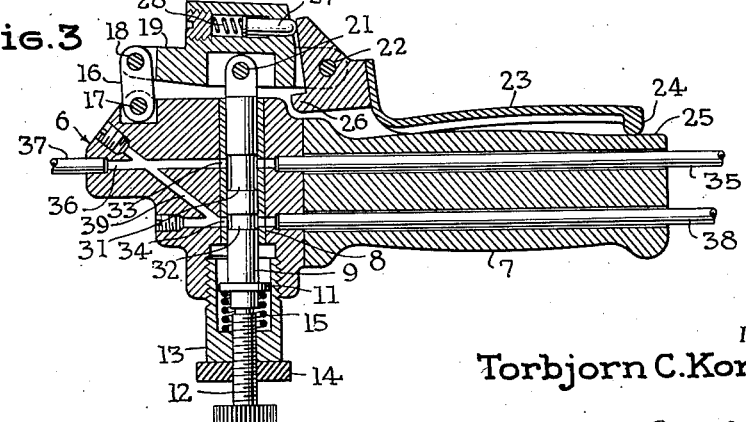
Fig. 3 shows the abnormal extreme position, reached by overpowering the impositive arresting means. In this position, both the blast port and the lubricant port are open.

In the position shown in Fig. 1, the supply of blast air and the supply of lubricant are each cut off. In the position of Fig. 2, blast air is supplied to the nozzle but flow of lubricant is cut off. In the position of Fig. 3, flow of blast air and lubricant air are each afforded.

Not only does the construction afford selective positioning, but it accomplishes this result by the use of a relatively short, and readily controlled hand-grip. The arrangement permits a desirable aligned position of the hand-grip 7 with reference to the nozzle 37. The compound motion, or reversing tilt characteristic of grip 23, permits the use of a short grip and minimizes the extreme angular motion of the grip.

What is claimed is:

1. The combination of a body having a guideway and a hand-grip carried by the body; a slider guided in said guideway and movable between two extreme functional positions in which motion it passes through an intermediate functional position; spring means biasing said slider to one of its extreme positions; an articulated lever reacting between said body and slider to move the slider in an active stroke against the opposition of said spring to the other extreme position through said intermediate functional position, said articulated lever comprising a portion fulcrumed on the body, a movable grip hinged to said portion to swing relatively thereto in an angular direction reverse to the active stroke of the fulcrumed portion, stops limiting relative swing of the grip in the opposite direction, and spring means for urging engagement of said stops; and means associated with the first grip for arresting that end of the movable grip which is remote from said fulcrum as the slider reaches said intermediate functional position, whereby motion of the movable grip is checked with the slider in said intermediate functional position, and on continued motion the movable grip tilts reversely and forces the lever and slider to said other extreme position.

2. The combination of a housing having a hand-grip fixed thereto and a guide-way; a controller plunger guided in said guide-way; means for limiting motion of the plunger in each direction; a primary lever hingedly connected with the housing and with the plunger on parallel axes to swing toward and from the housing, and thereby shift said plunger in its guide; a third parallel hinge axis carried by the swinging end of said primary lever; a swinging hand-grip mounted on said third hinge axis; coacting stops reacting between the primary lever and the swinging hand-grip and serving to limit relative swinging motion of the latter toward the fixed hand-grip; yielding means urging engagement of said coacting stops; and yielding means biasing said primary lever in a direction to separate the hand-grips, the swinging hand-grip being of such length, and the coacting stops being so located, that the free extremity of the swinging hand-grip will collide with a portion of the fixed hand-grip before the primary lever has moved to its limit of motion against said yielding means.

References Cited in the file of this patent
UNITED STATES PATENTS

| | | |
|---|---|---|
| 2,011,329 | Wayer | Aug. 13, 1935 |
| 2,554,562 | Dath | May 29, 1951 |